Figure 1:
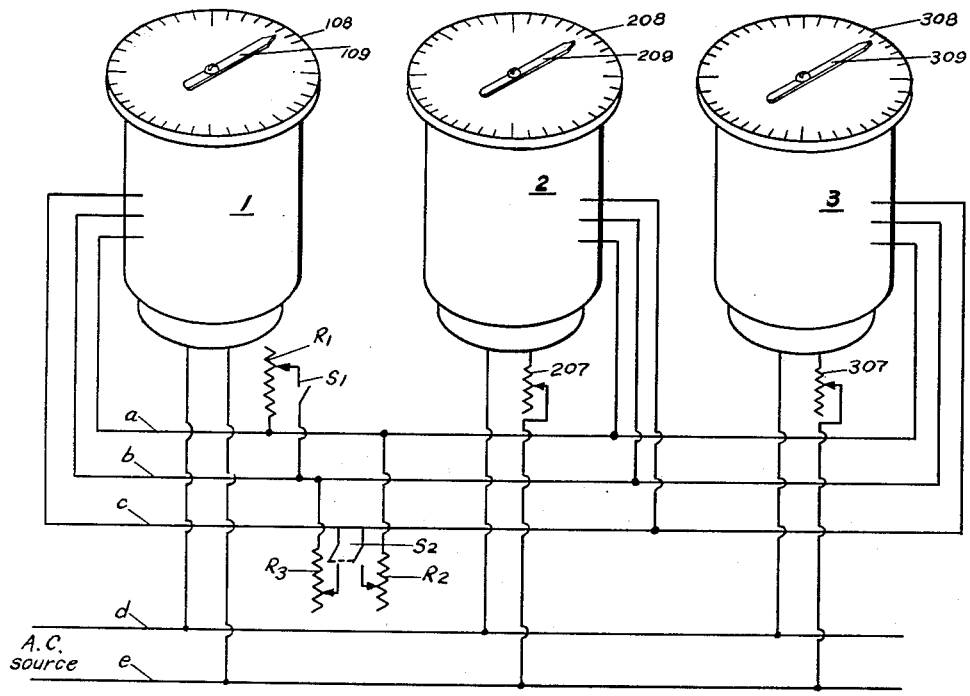

March 13, 1951     T. O. McCARTHY ET AL     2,544,710

ELECTRICAL REPEATER SYSTEM

Filed June 13, 1945     5 Sheets-Sheet 1

INVENTORS
Thomas O. McCarthy
Wilbur W. Thomas
BY Ralph L. Chappell
ATTORNEY

VOLTAGE INDUCED IN STATOR WINDINGS vs. ANGULAR POSITION OF ROTOR

INVENTORS
Thomas O. McCarthy
Wilbur W. Thomas
BY
Ralph L. Chappell
ATTORNEY

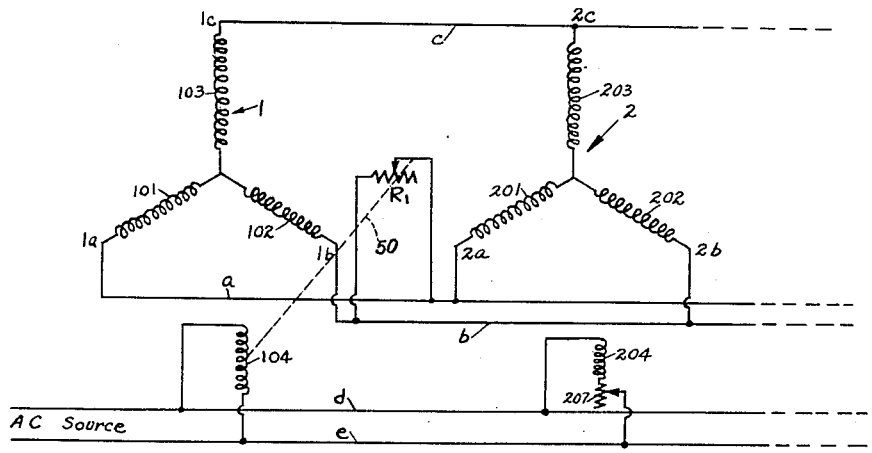
Fig. 5
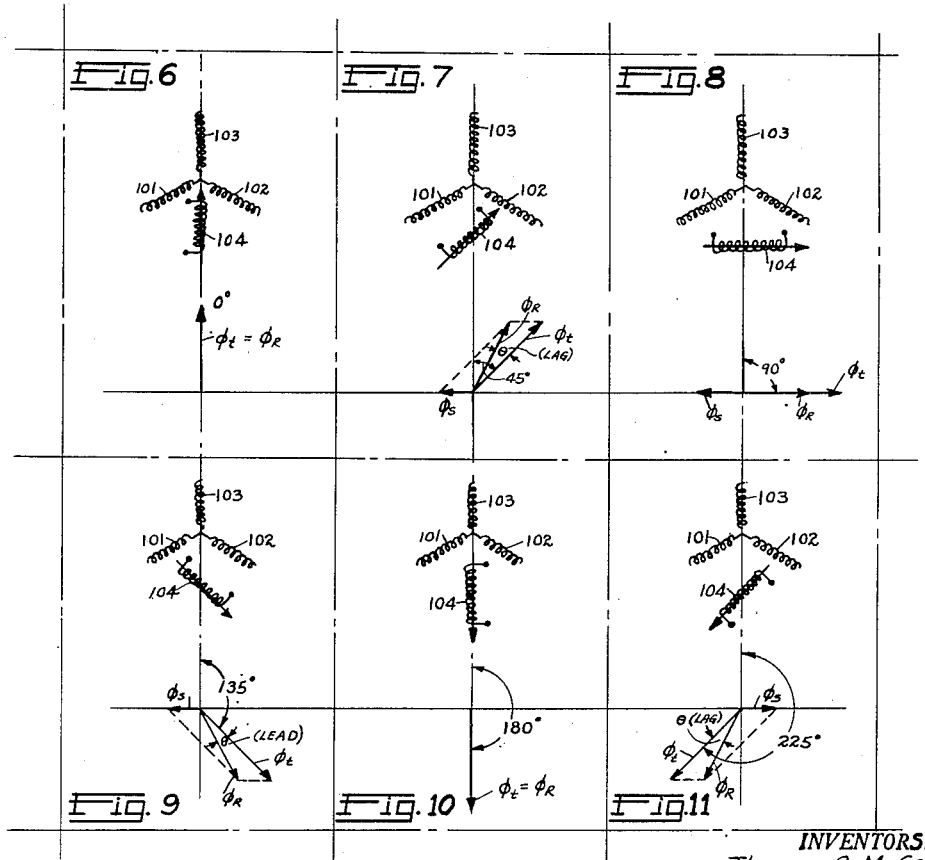
Fig. 6  Fig. 7  Fig. 8
Fig. 9  Fig. 10  Fig. 11
INVENTORS.
Thomas O. McCarthy
and Wilbur W. Thomas
BY Ralph L Chappell
ATTORNEY INVENTORS
Thomas O. McCarthy
Wilbur W. Thomas
BY Ralph L. Chappell
ATTORNEY

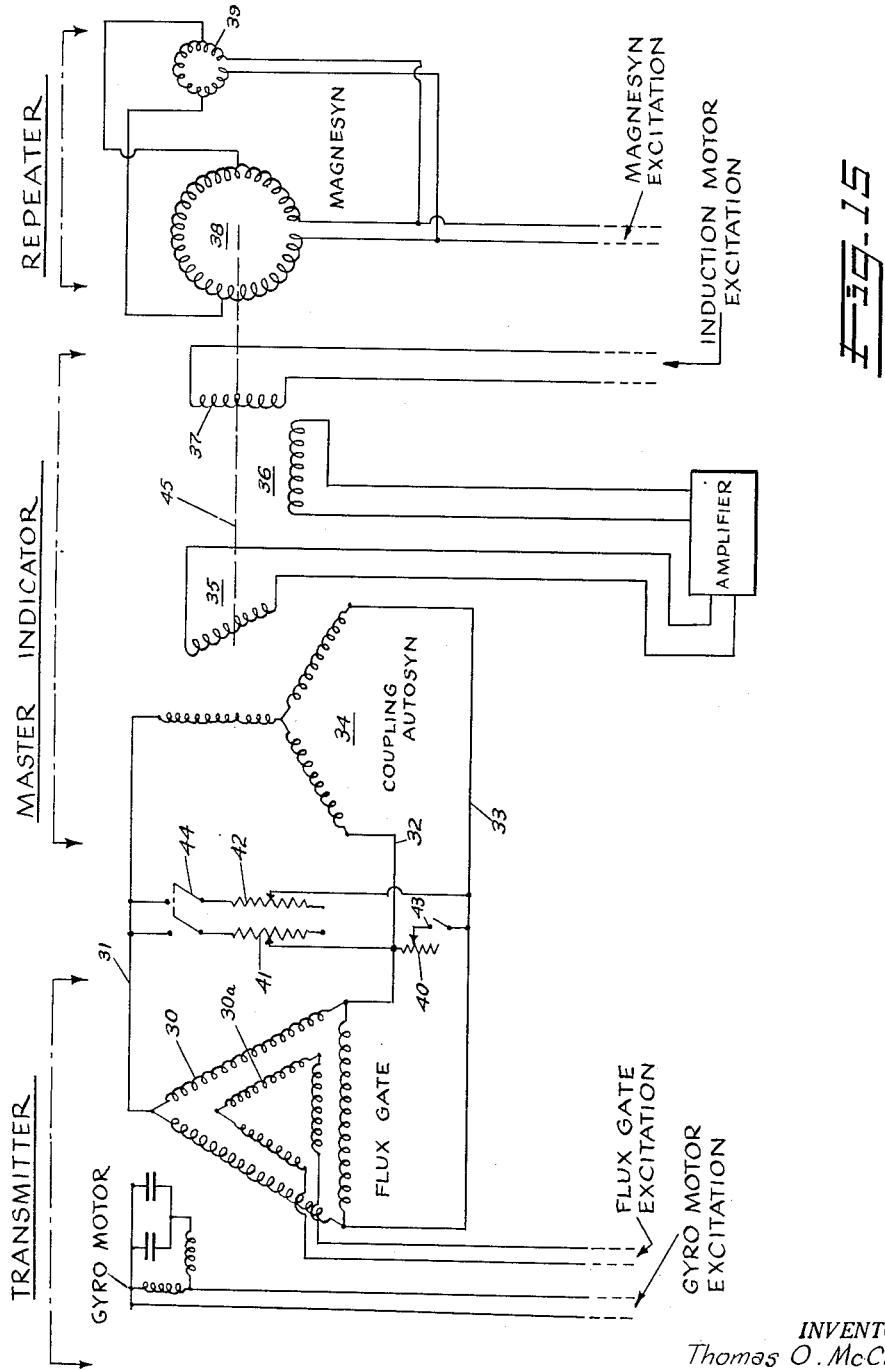

Patented Mar. 13, 1951

2,544,710

UNITED STATES PATENT OFFICE 2,544,710

ELECTRICAL REPEATER SYSTEM

Thomas O. McCarthy and Wilbur W. Thomas, United States Navy

Application June 13, 1945, Serial No. 599,282

11 Claims. (Cl. 318—24)

(Granted under the act of March 3, 1883, as amended April 30, 1928; 370 O. G. 757)

This invention relates to a method and means for controlling the synchronous relationship between the repeater and transmitter units of an electrical synchro signal or indicator transmitting system. Reference is hereby made to copending application Serial No. 535,529 filed on May 13, 1944 in the name of Thomas O. McCarthy, one of the present applicants.

A commonly used type of such an electrical system includes transmitting and repeating units which are generally alike. Each comprises a single circuit field winding and a polycircuit armature winding, one of which consists of a stationary element or stator and the other a movable element called the rotor. The field windings of the transmitter and repeater units are excited by a suitable source of alternating current and the respective armature windings of each unit are interconnected.

In the standard synchro transmission systems, the repeater unit rotors are designed to rotate in unison with the transmitter rotor so as to duplicate, at all times, the position of the rotor of the transmitter. Under certain conditions it is not desired to have the repeater follow the transmitter degree for degree. In the case of a remote reading compass system, for example, it is desired to introduce a correction for the well-known compass errors, so that the repeater or follow-up unit will be automatically compensated. Similarly, in a remote reading radio compass system there exists an error which is similar to the deviation error found in the compass art. This error is called the deviation error and it can also be corrected or compensated for or removed so as to provide a direct indication in the repeater units that is approximately true.

The general object of this invention is to provide a new and improved method and means for effecting a controllable asynchronous relation between the transmitter and one or more repeater units of electrical synchro transmission systems.

Another object of this invention is to provide means for varying the degree of asynchronism between the transmitter and repeater units depending upon the position of the transmitter rotor.

Still another object of this invention is to provide a new and improved means whereby the normal synchronous relation which exists between the rotor elements of a synchro system is made asynchronous by an amount which varies as a function of the instantaneous angular position of the rotor element of the transmitter unit relative to its stator element.

Another object of this invention is to provide an improved method for compensating the movement of the repeater unit of a synchro transmission compass bearing transmitter so as to cancel the compass deviation errors transmitted by the transmitter rotor.

Another object of this invention is to provide a method and means for selectively adjusting the magnitude and angular displacement of the repeater motion relative to that of the transmitter.

Still another object is to provide a compensating means for use with self synchronous motion transmitting systems on radio compass direction finding equipment to compensate for the errors therein so that the repeater unit will indicate the true radio direction rather than the direction of the antenna loop.

Figure 2:
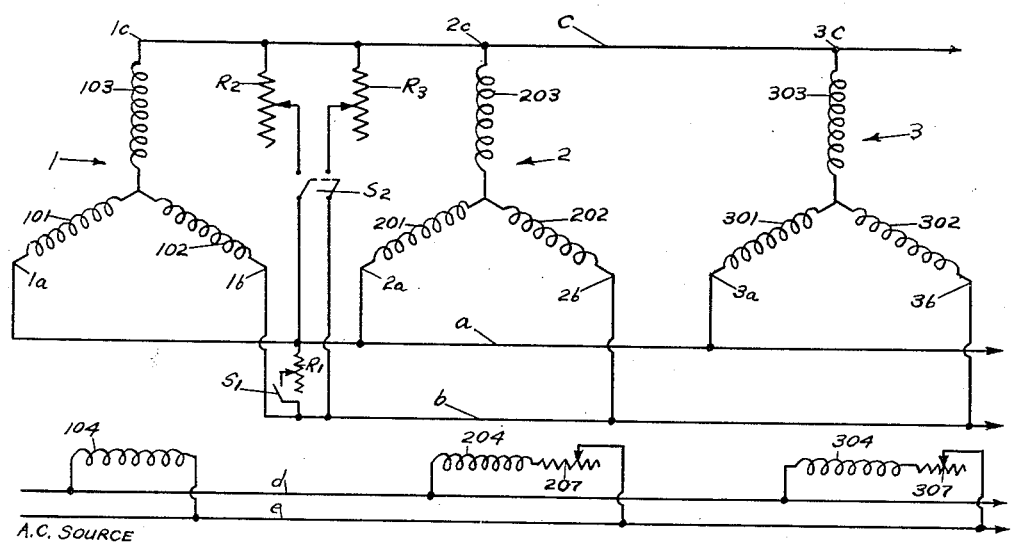
Figure 3:
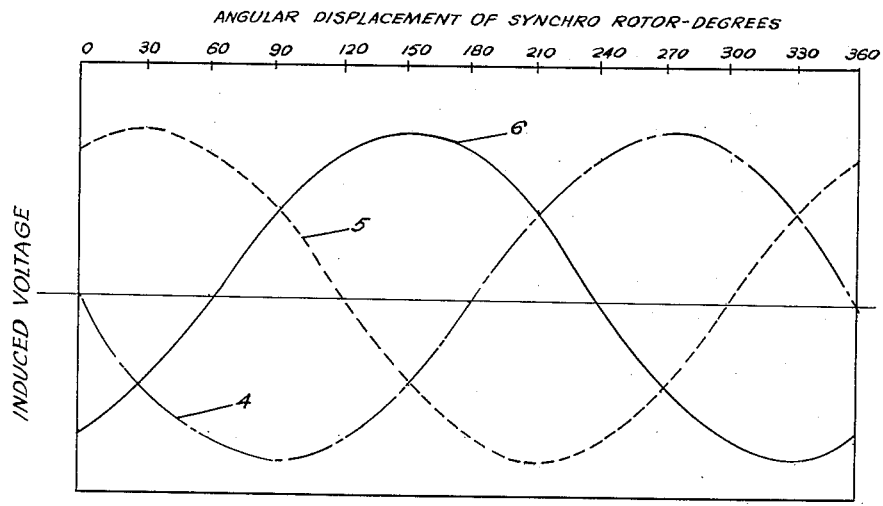
Figure 4:
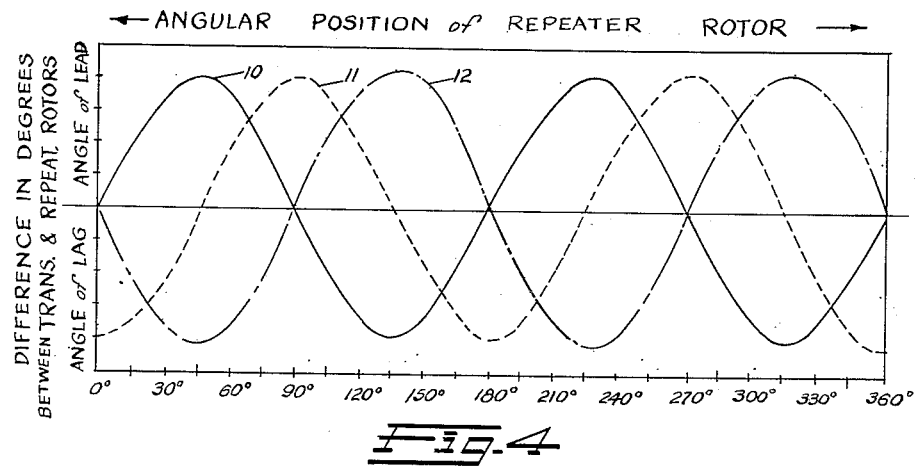
Figure 12:
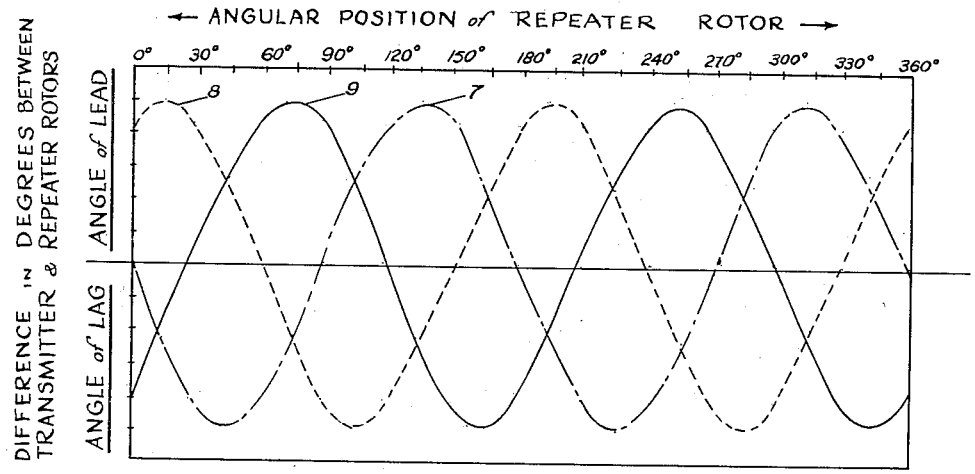
Figure 13:
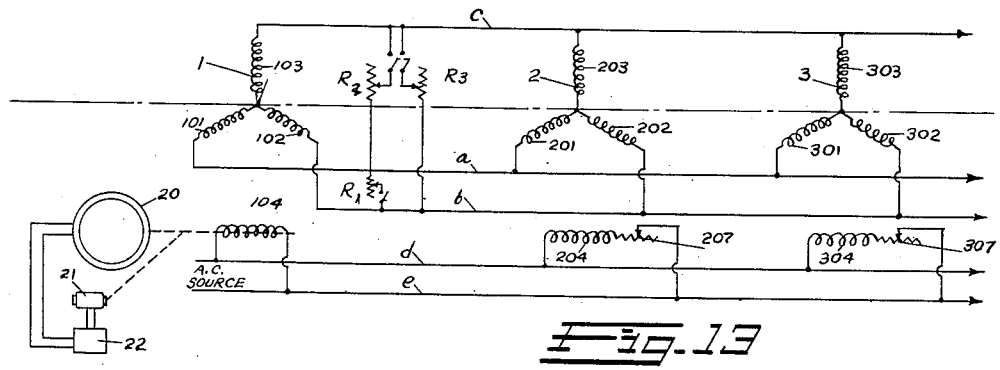
Figure 14:
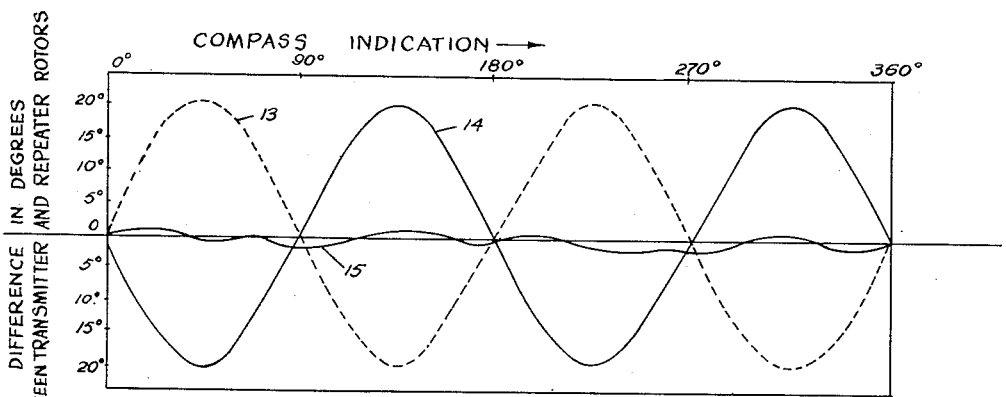

Further objects and advantages of this invention, as well as its construction, arrangement and operation, will be apparent from the following description and claims in connection with the accompanying drawings, in which, Fig. 1 is a diagrammatic view of the invention as applied to the well-known synchro signal transmitting systems, Fig. 2 is a circuit diagram of the synchro system shown in Fig. 1, Fig. 3 shows in graphic form the relation of induced stator voltage in a synchro transmitter unit for various angular positions of the rotor, Fig. 4 illustrates graphically the variation of lag and lead between repeater and transmitter rotor units of the synchro system comprising the invention, Fig. 5 is a detailed view of a portion of the circuit shown in Fig. 2, Figs. 6 to 11 inclusive are vector diagrams illustrating the theory of operation of the invention, Fig. 12 further illustrates graphically the lag and lead between receiver and transmitter rotors for various angle positions of the transmitter rotor, Fig. 13 is a diagrammatic view of the synchro signal transmitting system as applied to a radio direction finding compass system, Fig. 14 shows graphically how the lag and lead between the transmitter and the repeaters of this invention compensates for the standard deviation error of the compass, and Fig. 15 is a diagrammatic view of a gyro flux gate compass system embodying the features of this invention.

In the drawings, there is shown, in Fig. 1, an electrical synchro signal transmission system including the features comprising this invention. The transmission system includes a transmitter unit 1 electrically connected to a plurality of remotely located repeater motors or follow-up units indicated by numerals 2 and 3 respectively. Additional repeater units can be employed by coupling to the connecting network in the manner shown. Each of the units are equipped with graduated discs 108, 208 and 308 respectively, and pointers 109, 209 and 309 are secured to the rotor shaft of each unit so as to rotate relative to the discs.

Fig. 2 shows the electric circuit of the synchro transmission system of Fig. 1. As shown in Fig. 2, each of the indicating units 1, 2 and 3, respectively, is similar in structure and contains within its housing three equally spaced stator windings, arranged so as to surround a single phase two-pole armature or rotor which is supplied from an A. C. source.

The transmitter 1, as shown in Fig. 2 consists of the three stator windings 101, 102 and 103 whose inner extremities are commonly connected and whose outer extremities terminate in terminals 1a, 1b and 1c. The rotor 104 of transmitter unit 1 is rotatably mounted within the stator windings and is suitably excited from a single phase A. C. source comprising the supply lines $d$, and $e$ shown in Fig. 2.

Repeater units 2 and 3 are similar in construction to transmitter unit 1. Repeater unit 2 consists of stator windings 201, 202, and 203 terminating in terminals 2a, 2b and 2c, and rotor 204 connected to the single phase A. C. line $d-e$. A variable resistance 207 is connected in series with rotor 204. Repeater unit 3 includes the stator windings 301, 302 and 303 connected to terminals 3a, 3b, and 3c, and rotor 304. Rotor 304 is also excited by A. C. line $d-e$ through variable resistance 307.

The stators of the transmitter and repeater units are connected in parallel by a network comprising transmission lines $a$, $b$ and $c$. Line $a$ is connected across terminals 1a, 2a and 3a, line $b$, across terminals 1b, 2b and 3b, and line $c$ interconnects terminals 1c, 2c and 3c. Additional repeater units can be coupled to the transmission lines in like manner. As shown in Figs. 1 and 2 of the drawings, means are provided for varying the impedances of one or more elements of the synchro circuits. Such means comprise a variable impedance means such as the adjustable resistance $R_1$ connected across lines $a-b$ by switch $S_1$, and the variable resistances $R_2$ and $R_3$ connected across lines $c-a$ and $c-b$ respectively by means of the double pole switch $S_2$. Either $R_2$ or $R_3$ can be cut out if desired with switch $S_2$ closed by means of the variable adjustments on each of these resistances.

As shown in Fig. 1, the transmitter and repeater units are each provided with a calibrated dial 108, 208 and 308 and an indicator hand 109, 209 and 309 respectively. The indicator hands are secured to the rotor elements 104, 204 and 304 respectively to rotate therewith while the graduated dials are mounted on the housing of the units. The cards 108, 208 and 308 may be calibrated with standard compass bearings reading from 0° to 360°.

It will be seen in Fig. 2, that when the switches $S_1$ and $S_2$ are open, there is no resistance or circuit path across the trunk lines $a$, $b$ and $c$. The diagram therefore becomes that of the standard electrical synchro signal transmitting system.

As is well known in the art, in such a system the repeaters will be in phase with and will follow step by step the rotation of the rotor 104 of the transmitter 1. The reasons for this will be briefly described in order to make clearer the operation of this invention.

The rotors 104, 204 and 304 are excited by an alternating current and will each induce an alternating E. M. F. in each of the phases of the respective stator windings to which they are inductively coupled. The flux linking rotor coil 104 of unit 1 with stator coils 101, 102 and 103 will induce an E. M. F. in each of these coils the magnitude of which will depend on the relative angular position between such stator coil and rotor coil 104, since only the component of the linkage flux parallel to each of the stator coils will induce an E. M. F. in them. Therefore as the rotor 104 is rotated through 360°, the E. M. F. induced in each of stator windings 101, 102 and 103 will vary cyclically producing a corresponding cyclic voltage variation across lines $a$, $b$ and $c$ as shown in Fig. 3. In this figure, there is plotted the stator voltages as measured across lines $b-a$ (curve 4), $c-b$ (curve 5) and $a-c$ (curve 6) as the rotor is rotated clockwise through 360°.

From these curves it is evident that at any given position of the rotor 104, the voltages in stator coils 101, 102 and 103 are, in the general case, all unequal either in magnitude or sign, or both. However since repeater units 2 and 3 have similar characteristics as transmitter 1 and are excited from the same source, the voltages induced the stator windings of the repeater units 2 and 3 are equal and, relative to the circuit, are in opposition to those induced in the transmitter unit stator when their rotors are in correspondence with the transmitter unit rotor 104. Under such condition no currents flow through the trunk lines $a$, $b$ and $c$ and the system is in equilibrium.

Rotation of transmitter rotor 104 causes a transient change in such equilibrium since the voltages in stator coils 101, 102 and 103 of the transmitter unit vary in accordance with the values shown in Fig. 3, and current flow is accordingly set up in trunk lines $a$, $b$, and $c$. This current flow through the stator windings sets up torque fields of flux and these torque fields exert a torque on each of the rotors 104, 204 and 304. Since transmitter rotor 104 is fixed against rotation by the mechanism which has turned it, the rotors 204 and 304 of the repeater unit will rotate until in correspondence with rotor 104 at which time the voltages induced in each of the repeater stator windings again are equal and, relative to the circuit, in opposition to those induced in the transmitter stator and equilibrium regained.

The structure comprising this invention is designed to provide an asynchronous relation between the transmitter unit 1 and repeater units 2 and 3. By establishing a controllable and predetermined angular displacement between the motion of the transmitter and repeater rotors, the motion of the transmitter as reproduced by the repeater units can be altered and the magnitude of such alteration can be made variable and cyclic as will be shown.

In the following explanation the transmitter and only one repeater unit (unit 2) are considered as any additional repeater units behave in a like manner. The following symbols are employed.

$\phi t$ is the flux in the transmitter stator due to current flow the transmitter rotor 104.

$\phi s$ is the flux in the transmitter stator winding due to current flow caused by variable resistor $R_1$.

$\phi r$ is the resultant flux governing movement of the repeater rotors.

Fig. 5 shows the circuit of transmitter unit 1 (Fig. 2) coupled to repeater unit 2 and switch $S_1$ closed, thereby placing resistance $R_1$ across trunk lines $a$ and $b$. Figs. 6 through 11 inclusive are vector diagrams showing the relationship of the flux fields generated as the rotor 104 of transmitter unit 1 is rotated through 6 positions increasing from electrical 0° in 45° increments. The position of the rotor coil in relation to the stator windings are also indicated.

With the rotor 104 occupying a position relative to the stator windings as shown in Figs. 5 and 6, the flux linking rotor 104 and stator coil 103 is a maximum. Since rotor 104 is symmetrical with respect to coils 101 and 102, there will be an equal component of the flux linking rotor 104 therewith, parallel to each of these coils, which will set up E. M. F.'s in them. Since the same condition prevails in the stator coils of repeater unit 2 the voltages induced in coils 201 and 202 are equal and, relative to the circuit, in opposition to those induced in coils 101 and 102 and for a 0° position of transmitter repeater rotors (104 and 204) there will be no voltage appearing across stator connecting lines $a$ and $b$ by virtue of the fact that the 0° position of the transmitter rotor was determined by such zero voltage condition between stator terminals $1a$, $1b$ and $2a$ and $2b$ respectively. For this condition no current flows through resistor $R_1$. The flux $\phi t$ set up by the transmitter rotor is as shown in Fig. 6, and has the same phase as $\phi r$, the resultant flux. $\phi r$, the resultant field in the transmitter stator will determine the direction and magnitude of the torque producing flux in the stator windings of the repeater unit 2, and the field will rotate as the transmitter rotor is turned.

When the rotor 104 is rotated clockwise to a 45° position as shown in Fig. 7, the flux $\phi t$ set up by the rotor 104 has components parallel to each of the stator coils 101, 102, and 103, each of different magnitude, and E. M. F.'s are accordingly induced which set up current flow in lines $a$ and $b$ across which resistance $R_1$ is connected. In the normal operation of a synchro transmitter (i. e. without resistance across the lines) the flux set up in the stators, due to these currents will exert a torque on rotor 204 to the repeater, thereby turning it until it is in correspondence with the transmitter rotor. Due to the presence of the resistor $R_1$ across lines $a$—$b$ however, there will be a current flowing from the stators of the transmitter and repeater through the resistor $R_1$, proportional to the impedances of the respective stator windings and this current will set up a reactive flux in the stator of the transmitter 1 the approximate position of which is shown by vector $\phi s$ in Fig. 7. The flux due to rotor 104 is shown as $\phi t$ and the resultant field flux $\phi r$ can then be determined by construction as shown. The flux $\phi s$ in the stator, due to the presence of the resistor $R_1$ therefore results in a phase shift of the resultant flux $\phi r$ from the position it would normally occupy, were no resistance present across lines $a$—$b$. Thus the resultant flux $\phi r$ is shown in Fig. 7 to lag the rotor flux $\phi t$ by an angle $\theta$ and since the resultant flux $\phi r$ produces the torque producing flux in the stator of the repeater unit 2, the direction of which controls the position of repeater rotor 204, it can be seen that the latter instead of assuming a position corresponding to that of transmitter rotor 104 (i. e. 45°) will rotate to a position corresponding to that of $\phi r$ in Fig. 7 and will therefore lag the angular position of rotor 104 by the angle $\theta$. Thus, as the transmitter rotor is turned from the 0° position to a 45° position the repeater rotor 204 (Fig. 2) lags in phase relationship, the amount of lag varying from 0 to a maximum value at this 45° position as indicated by the curve 12 shown in Fig. 4 of the drawings, which curve shows the relative angular position (lag or lead) with respect to the transmitter rotor of the repeater rotor for various angular positions of this rotor.

Rotation of the transmitter rotor 104 to the 90° position is illustrated in Fig. 8. The flux linkage is now a minimum between rotor coil 104 and stator coil 103 and has equal components parallel to stator coils 101 and 102. The field $\phi t$ due to the rotor 104 and that created by the current in the stator $\phi s$ is indicated, as well as the resultant field $\phi r$. The repeater rotor will therefore assume a 90° position, and will be in correspondence with the transmitter rotor.

Further rotation of the transmitter rotor, for example to a 135° position as shown in Fig. 9 causes the repeater rotor 204 to assume a position which leads that of the transmitter rotor, as shown by the angle $\theta$ between $\phi t$, the transmitter rotor flux vector and $\phi r$ the resultant flux vector. Thus between the 90 and 180 degree position of the transmitter rotor 104, the repeater rotor 204 will have a phase lead $\theta$, the magnitude of which varies in accordance with curve 12 of Fig. 4.

When rotor coil 104 again assumes a position aligned with stator coil 103 (i. e. the 180° position), as in Fig. 10, a similar condition exists as disclosed in connection with Fig. 6 except that the resultant field as indicated by vector $\phi r$ is in the direction shown, that is 180° from its position in Figure 6. Here again the receiver rotor will be in correspondence with the transmitter rotor.

In the 225° position of transmitter rotor 104 the receiver rotor 204 will again lag the transmitter rotor as shown by the vector diagram of Fig. 11. The amount of lag and lead of the receiver rotor when rotated from 180° to 360° is similar to that which occurred during the first 180° of transmitter rotor rotation.

Summarizing, it can be seen that with resistance $R_1$ connected across lines $a$ and $b$ and with transmitter rotor 104 in the zero position as shown in Fig. 5, the repeater rotor 204 will alternately lag and lead the transmitter rotor when the former is rotated, in a cyclic or sinusoidal manner as shown by the curve 12 of Fig. 4. The receiver rotor 204 will be in phase with the transmitter rotor in the 0°, 90°, 180°, 270°, and 360° positions of the latter and the amount of receiver rotor lag and lead will be a maximum at the 45°, 135°, 225°, and 315° positions of the repeater rotor. The amount of lag and lead between transmitter and receiver rotors depends on the value of the resistance ($R_1$) employed. The greater the value of $R_1$, the more nearly will the rotors be in correspondence and the amount of lag or lead increases with decreasing resistance ($R_1$).

The effect of adding a resistance across line $c$—$a$ and $c$—$b$ respectively, as by closing the switch $S_2$ (Fig. 2) and adjusting the variable resistance $R_2$ and $R_3$ is to change the relative positions of transmitter and repeater rotors as the former is rotated. This is clearly illustrated in Fig. 12 of the drawings in which curve 7 shows the amount of lag and lead of the repeater rotor with resistance ($R_1$) across lines $a$—$b$ only, curve 8 shows the receiver rotor lag with resistance $R_2$ across lines $c$—$a$ only, and curve 9 shows the effect of resistance $R_3$ across lines $c$—$b$ only. From this figure it is clear that the magnitude of the angle of lag or lead between transmitter and repeater rotors for any given position of the transmitter rotor can be varied.

In Fig. 4, curve 10 shows the amount of repeater lag and lead versus angular position of the transmitter rotor when resistances are placed across both lines $c$—$a$ and $c$—$b$ (Fig. 2) as by closing switch $S_2$ only and adjusting resistances $R_2$ and $R_3$. It will be seen that curve 10 of Fig. 4 is equal and opposite to curve 12 of Fig. 4, and curve 7 of Fig. 12 which is for the condition in which resistance is placed across lines $a$—$b$ alone.

Curve 11 in Fig. 4 shows the lag-lead relationship between transmitter and repeater rotors for a condition in which resistances are connected across lines $c$—$a$ and $c$—$b$ (Fig. 2) but with each resistance ($R_2$ and $R_3$) of different value. By keeping a constant ratio between resistors $R_2$ and $R_3$ it is possible to vary the amplitude of the lag-lead curves without shifting the curve along the horizontal axis. Changing the ratio shifts the curve along the axis in one direction or the other depending upon the numerical value of the ratio.

Resistances 207, 307 etc. (Figs. 1 and 2) are placed in series with the repeater rotors 204 and 304 to minimize the tendency of the repeater rotors to oscillate or jerk when in one or more of the quadrantal positions. Referring to Fig. 8, for example, it can be seen that the flux due to the current in repeater rotor 204 (Fig. 5) is in opposition to the flux $\phi t$ in the 90 degree position and without the series resistance 207 the repeater rotor would tend to become unstable. The series resistance 207 serves to modify the flux at this point, so as to stabilize the motion of the repeater rotor.

The application of this invention to an aircraft radio compass system is shown in Fig. 13 of the drawings. The antenna loop 20 is shown to be mechanically coupled to both the transmitter rotor 104 and to drive motor 21. The signal from the antenna loop 20 is fed to the amplifier 22 and the amplified signal is fed to the drive motor 21. Rotation of the compass or antenna loop is transmitted to the synchro transmitter unit 1 which in turn will actuate the remote repeater units 2, 3, etc.

The quadrantal deviation curve for the aircraft radio compass is shown as curve 13 in Fig. 14. Were a standard synchro system employed to duplicate the motion of the loop 20 of the radio compass shown in Fig. 13, the compass error represented by the quadrantal deviation curve 13 in Fig. 14 would be duplicated in each of the follow-up or repeater units. Since the quadrantal deviation curve 13 (Fig. 14) is approximately sinusoidal, it becomes apparent that if the repeater rotors of the synchro system are made to alternately lag and lead the motion of the transmitter unit throughout a cycle in a sinusoidal manner the amplitude, phase and frequency of which is equal and opposite to the deviation curve 13 shown in Fig. 14, then the compass error represented by such curve 13 will in effect be cancelled in the repeater unit.

This is graphically illustrated in Fig. 14 in which curve 14 shows a variation in repeater rotor (204, Fig. 13) motion for various positions of the transmitter rotor 104. As was previously stated, the repeater rotors can be made to follow a curve of desired shape by suitable choice of the resistances or impedances employed across the trunk lines $a$, $b$ and $c$.

The motion of the repeater rotor 204 in Fig. 13 can therefore be made to match curve 14 of Fig. 14, and will cancel out the quadrantal deviation curve 13. In practice, the resultant curve will appear as curve 15 in Fig. 14 due to frictional errors and errors due to over and under compensation.

The structure comprising this invention is shown applied to a gyro flux gate compass system in Fig. 15 of the drawings.

Fig. 15 shows diagrammatically the transmitter, master indicator and repeater units of a gyro flux gate compass system. The flux gate consists of a primary $30a$, and a secondary element 30 the latter of which is connected by the three wire network 31, 32, and 33 to the stator 34 of the coupling "Autosyn." The "Autosyn" unit is similar to the standard control transformer type of synchro signal transmitter and includes, in addition to the stator winding 34, a rotor or control transformer 35. Signal voltages induced in the rotor 35 are fed through the amplifier to one phase 36 of a two phase induction torque motor. The second phase winding 37 of the induction motor is separately excited as shown. The induction motor is mechanically coupled as shown at 45 to the "Autosyn" rotor 35 and supplies the torque to rotate the latter. Thus the "Autosyn" rotor 35 does not produce any torque but merely delivers a signal which controls the operation of a separate torque producing means (the induction motor) which rotates the rotor 35 as well as the transmitting "Magnesyn" 38 to which it is also coupled. The "Magnesyn" 38 in turn controls the remote repeater unit 39.

The structure comprising the invention in this modification includes the variable resistances 40, 41 and 42 connected across lines 31, 32, and 33 respectively by the switches 43 and 44. Considering the portion of the circuit comprising the flux gate (30 and $30a$) and the coupling "Autosyn" (34 and 35) it can be seen that the structure is similar to that described in connection with the synchro systems illustrated in Figures 2 and 5. The theory governing the asynchronous relation between transmitter and repeater units therein described is equally applicable to the structure shown in Figure 15. Thus by inserting resistances 40, 41 and 42 across the lines 31, 32 and 33 either singly or in combination in the manner previously described the rotation of the "Autosyn" rotor 35 can be made to cyclically lag and lead that of the flux gate in a manner that will cancel the quadrantal deviation curve of the flux gate compass. Therefore the coupling "Autosyn" (34—35) of the master indicator of the gyro flux gate compass system will indicate the true compass bearings instead of indicating the compass error represented by the quadrantal deviation curve, as transmitted by the flux gate.

Referring to Figs. 1, 2, 5, 13 and 15, the means for varying the impedances or resistances ($R_1$, $R_2$, $R_3$, 40, etc.) are shown to be manually variable so that the change in circuit impedance caused by the introduction of such impedance in the circuit is set at a predetermined value for a given operating condition. If desired, the variable impedance means can be mechanically coupled to the rotor of the transmitter unit, in which event the value of the impedance in the circuit would vary cyclically with rotation of the transmitter rotor. This would have the effect of further varying the angular displacement between transmitter and repeater rotors as the former is rotated. Such a mechanical coupling is illustrated at 50 in Fig. 5. While there is here shown a mechanical linkage between the adjustable tap of resistor R₁ and rotor 104, it will be understood that, where desired or necessary, such linkages may be provided between the transmitter rotor and the adjustable taps of resistors R₁, R₂, R₃, etc., for movement thereof, in synchronism, with the rotor.

While the phase shifting means for the torque field has been illustrated as a resistance, it is clear that any electrical impedance means such as an inductance, capacitance or a combined reactive circuit can be employed.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An electrical synchro signal-transmitting system comprising similar transmitter and repeater units, each of said units consisting of a polyphase armature and a rotatable field coil inductively coupled to said armature and excited from a common alternating current source to produce a torque field in said armature, a three-wire circuit interconnecting the armatures of the transmitter and repeater units in parallel, and individual impedance elements respectively connected across successive pairs of wires of said circuit, said impedance elements producing a reactive field in each armature which combines with said first mentioned torque field to produce a resultant torque field the angular position of which is dependent on the relative position between said transmitter unit armature circuit and said transmitter unit field coil, said resultant torque field determining the position of said repeater field coil.

2. An electrical synchro signal-transmitting system comprising a transmitting unit, one or more repeater units, plural-wire circuit means electrically connecting said transmitting and said repeater units in polyphase relation, and means for establishing an asynchronous relation between said repeater and transmitter units; said means comprising a plurality of impedance elements, and means respectively connecting individual ones of said elements across successive pairs of wires of said circuit means for introducing substantially unequal impedance values in said circuit means.

3. An electrical synchro signal transmitting-system comprising a rotatably mounted field coil excited by an alternating current source, a multi-winding armature circuit inductively coupled to said field coil and individual impedance elements connected across adjacent pairs of windings of said armature circuit.

4. In a telemetering system including a transmitting unit and a plurality of similar repeater units, each of said units including a polyphase circuit stator and a field coil rotatably mounted relative to said stator, the combination of a plurality of transmission lines interconnecting the polyphase stator circuits of the transmitter and repeater units, and individual variable resistances respectively connected across pairs of said transmission lines taken in cyclic order.

5. In an electrical synchro signal-transmitting system comprising a plurality of polyphase armature circuits interconnected by an electrical network of transmission lines and having flux producing field windings rotatably mounted with respect to each of said armature circuits, the combination of flux field phase shifting means connected in said armature circuits, said flux field phase shifting means comprising resistance means connected across the phases of said polyphase armature circuits, and means for controlling the magnitude of said resistance means in accordance with the angular position of said field windings relative to said armature circuits.

6. An electrical synchro type of signal-transmitting system comprising similar transmitter and repeater units, each unit consisting of a polyphase stator winding and a single phase rotatable field winding, similar phases of the stator of each unit being interconnected by electrical network means, each of said field windings being electrically interconnected and commonly excited from an alternating current source, rotation of said field winding in said transmitter unit producing a rotating torque field in said transmitter stator winding, a plurality of impedance elements, and means connecting individual ones of said elements across pairs of phases of said polyphase stator windings, said impedance means being adapted to create a reactive flux field in said stator windings of magnitude depending upon the relative instantaneous position of said transmitter field winding, whereby upon interaction of said reactive flux field with said torque field, a resultant torque field whose angular position is determined by such relative instantaneous position of said transmitter field winding is produced.

7. A compass bearing indicating system for compasses having a quadrantal deviation error, comprising an earth inductor compass, an electrical synchro signal transmitting system having similar transmitter and repeater units, said transmitter unit being mechanically coupled to said compass, a plurality of conductors interconnecting said transmitter and repeater units in polyphase relation, and a like plurality of electrical impedance elements, each said element being connected across respective pairs of said conductors to cause an asynchronous angular relation between said transmitter and repeater unit, the amount of said asynchronism being variable throughout a cycle and substantially equal and opposite for a 360° revolution to the quadrantal deviation error of said compass.

8. An electrical synchro signal-transmitting system comprising, similar transmitting and repeater units, each of said units consisting of a polyphase armature circuit and a rotatable field coil inductively coupled to said armature, the field coil of said transmitting unit being excited from an alternating current source to produce a torque field in said transmitting unit armature, the field coil of said repeater unit being electrically coupled to the control field of a torque motor, electrical circuit means interconnecting the armatures of the transmitter and repeater units, adjustable electrical impedance means connected in said electrical circuit means and including an impedance-controlling member, and means coupling said field coil and said element for conjoint movement, whereby said impedance means produces a reactive field in each armature which combines with said first mentioned torque field to produce a resultant field the angular position of which is dependent on the relative position between said transmitter unit armature circuit and said transmitter unit field coil, said resultant field inducing an electro-motive force in said repeater field coil which actuates and controls said torque motor.

9. Deviation-error-compensated radio-direction finding apparatus comprising directional radio-direction finding means for providing an indication of the bearing of a craft, said direction finding means being subject to a quadrantal deviation error, a synchro signal transmitting unit coupled to said direction finding means for transmitting a signal corresponding to the bearing of the craft, a repeater unit, said transmitting and repeater units each comprising a rotatable member and a stationary winding, a three-conductor transmission system interconnecting said windings whereby the movement of the rotatable member of said transmitter normally is effective to cause a corresponding movement of the rotatable member of said receiver, and electrical compensating means including first, second and third variable impedance elements, respectively connected across the first and second, the second and third, and the first and third conductors of said transmission system, thereby to provide impedance values varying by unequal amounts from a predetermined value connected across the transmitter-repeater circuit, said impedances being adapted to provide a correction signal whereby an asynchronous relation between said transmitter and said repeater units is derived to compensate for the deviation error.

10. The system as in claim 3 wherein said impedance elements are resistors.

11. In an electrical synchro signal-transmitting system having a plurality of polyphase armature circuits interconnected by an electrical network of transmission lines and including flux producing field windings rotatably mounted with respect to each of said armature circuits, the combination of flux field phase shifting means connected in said armature circuits and comprising individual resistor elements connected across respective pairs of said transmission lines.

THOMAS O. McCARTHY.
WILBUR W. THOMAS.

REFERENCES CITED

The following references are of record in the file of this patent:

UNITED STATES PATENTS

| Number | Name | Date |
|---|---|---|
| 1,612,117 | Hewlett et al. | Dec. 28, 1926 |
| 1,684,137 | Mittag | Sept. 11, 1928 |
| 1,895,942 | Rowell | Jan. 31, 1933 |
| 2,164,179 | Moore | Jan. 27, 1939 |
| 2,172,410 | Riggs | Sept. 12, 1939 |
| 2,308,566 | Noxon | Jan. 19, 1943 |
| 2,460,798 | McCarthy | Feb. 8, 1949 |

FOREIGN PATENTS

| Number | Country | Date |
|---|---|---|
| 880,645 | France | Jan. 6, 1943 |
| 344,135 | Germany | Nov. 17, 1921 |